(12) United States Patent
Saxin

(10) Patent No.: US 10,009,804 B2
(45) Date of Patent: Jun. 26, 2018

(54) METHOD AND APPARATUS FOR NEIGHBOR CELL RELATION CONFIGURATION

(71) Applicant: TELEFONAKTIEBOLAGET LM ERICSSON (PUBL), Stockholm (SE)

(72) Inventor: My Saxin, Järfälla (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 92 days.

(21) Appl. No.: 15/118,654

(22) PCT Filed: Feb. 14, 2014

(86) PCT No.: PCT/SE2014/050181
§ 371 (c)(1),
(2) Date: Aug. 12, 2016

(87) PCT Pub. No.: WO2015/122811
PCT Pub. Date: Aug. 20, 2015

(65) Prior Publication Data
US 2017/0070922 A1    Mar. 9, 2017

(51) Int. Cl.
*H04W 36/00*  (2009.01)
*H04W 4/06*  (2009.01)
*H04W 24/02*  (2009.01)
*H04W 36/32*  (2009.01)

(52) U.S. Cl.
CPC ......... *H04W 36/0061* (2013.01); *H04W 4/06* (2013.01); *H04W 36/0066* (2013.01); *H04W 36/0083* (2013.01); *H04W 24/02* (2013.01); *H04W 36/32* (2013.01)

(58) Field of Classification Search
CPC .. H04B 7/18541; H04L 47/767; H04W 36/00; H04W 36/0005; H04W 36/0016; H04W 24/02; H04W 36/0061; H04W 36/0066; H04W 36/0083; H04W 36/32; H04W 4/06
USPC .......................................................... 370/331
See application file for complete search history.

(56) References Cited

U.S. PATENT DOCUMENTS

| | | |
|---|---|---|
| 2004/0152480 A1 | 8/2004 | Willars et al. |
| 2005/0020203 A1 | 1/2005 | Losh et al. |
| 2010/0015977 A1 | 1/2010 | Francalanci et al. |
| 2010/0124924 A1 | 5/2010 | Cheng et al. |
| 2011/0312369 A1 | 12/2011 | Furuya et al. |
| 2012/0009972 A1* | 1/2012 | Viering ............. H04W 36/22 455/525 |
| 2012/0082028 A1* | 4/2012 | Kojima ............. H04W 36/22 370/230 |

(Continued)

FOREIGN PATENT DOCUMENTS

| | | |
|---|---|---|
| EP | 2629568 A1 | 8/2013 |
| WO | 2009058069 A1 | 5/2009 |
| WO | 2013097063 A1 | 7/2013 |

*Primary Examiner* — Robert Lopata
(74) *Attorney, Agent, or Firm* — Sage Patent Group

(57) ABSTRACT

A method and a related radio network node for configuring neighboring cell relations of a cell. The method is performed in a radio network node of a wireless communication system serving wireless devices in the cell. The method comprises monitoring a rate of wireless device accesses in the cell, and configuring neighboring cell relations of the cell based on the monitored rate of wireless device accesses in the cell.

12 Claims, 7 Drawing Sheets

(56) References Cited

U.S. PATENT DOCUMENTS

| | | | | |
|---|---|---|---|---|
| 2012/0289163 | A1* | 11/2012 | Fu | H04W 48/16 455/62 |
| 2013/0070635 | A1* | 3/2013 | Suo | H04W 52/0206 370/252 |
| 2013/0084872 | A1* | 4/2013 | Suga | H04W 36/0061 455/437 |
| 2013/0143566 | A1* | 6/2013 | Kubota | H04W 36/30 455/436 |
| 2013/0273917 | A1* | 10/2013 | Sfar | H04W 36/0094 455/436 |
| 2014/0162650 | A1* | 6/2014 | Islam | H04W 36/0083 455/436 |
| 2015/0078167 | A1* | 3/2015 | Papa | H04W 28/10 370/235 |
| 2015/0103657 | A1* | 4/2015 | Henderson | H04W 36/0083 370/232 |
| 2016/0073312 | A1* | 3/2016 | Sridhar | H04W 48/16 370/235 |
| 2016/0081036 | A1* | 3/2016 | Luo | H04W 52/343 370/329 |
| 2016/0165478 | A1* | 6/2016 | Yao | H04L 41/0823 370/236 |
| 2016/0174125 | A1* | 6/2016 | Kobayashi | H04W 16/08 370/332 |
| 2016/0330745 | A1* | 11/2016 | Miao | H04W 72/046 |
| 2017/0303178 | A1* | 10/2017 | Saska | H04W 36/22 |

\* cited by examiner

METHOD AND APPARATUS FOR NEIGHBOR CELL RELATION CONFIGURATION

TECHNICAL FIELD

The disclosure relates to a wireless communication system, and more specifically to a radio network node of the wireless communication system and to a method for configuring neighbor cell relations of a cell.

BACKGROUND

Global System for Mobile Communications (GSM) is a standard set developed by the European Telecommunications Standards Institute (ETSI) to describe protocols for second generation (2G) digital cellular networks used by mobile phones. The GSM standard originally described a digital, circuit-switched network optimized for full duplex voice telephony, and was expanded over time to include data communications, first by circuit-switched transport, then packet data transport via General Packet Radio Services (GPRS) and Enhanced Data rates for GSM Evolution (EDGE). Further improvements were made when the 3rd Generation Partnership Project (3GPP) developed third generation (3G) Universal Mobile Telecommunication System (UMTS) standards followed by fourth generation (4G) Long Term Evolution (LTE) Advanced standards.

In the radio access network of a wireless communication system such as GSM, UMTS or LTE, a wireless device is wirelessly connected to a Radio Base Station (RBS). An RBS is a general term for a radio network node capable of transmitting radio signals to a wireless device and receiving signals transmitted by the wireless device. The Base Transceiver Station (BTS) is the RBS in GSM. In GSM, another radio network node—a so called Base Station Controller (BSC)—provides the intelligence behind the BTS. Typically a BSC has several BTSs under its control. The BSC handles allocation of radio channels, receives measurements from the mobile phones, and controls intra-BSC handovers from BTS to BTS. In UMTS and LTE, the RBS is commonly referred to as a NodeB and an evolved NodeB (eNodeB) respectively. In UMTS, a Radio Network Controller (RNC) controls a number of NodeBs, and is in charge of management of radio resources in cells for which the RNC is responsible. In LTE, the eNodeB is the only radio network node. The eNodeB is a logical node in LTE and the RBS is a typical example of a physical implementation of an eNodeB.

FIG. 1a illustrates a radio access network in a UMTS or a GSM, with an RBS 20 wirelessly connected to a wireless device 40 located within the RBS's geographical area of service, called a cell 30. An RNC 10 in UMTS or a BSC 10 in GSM controls the RBS 20. The RNC/BSC 10 serves the wireless device 40 in the cell 30 via the RBS 20. The RNC/BSC 10 is connected to the Core Network (CN) (not illustrated). FIG. 1b illustrates a radio access network in an LTE system. An eNodeB 50 serves a User Equipment (UE) 40 located within the cell 30. The eNodeB 50 is directly connected to the CN (not illustrated).

One of the most challenging scenarios in a broadband wireless access technology is a high mobility scenario, such as scenarios in the high speed railway domain. A high speed railway introduces quite specific challenges especially with regards to the handover and cell change procedure. When a wireless device is moving very fast as when it is in a High Speed Train (HST), the wireless device has a limited amount of time to measure neighboring cells before a handover.

In existing solutions, a separate HST network, i.e., a wireless network comprising cells covering only the high speed railway, is created. The HST network cells 200 are overlapping the normal cellular network 210, as illustrated in FIG. 2a. The HST network cells 200 are deployed as a trail of cells along the railroad track. With a separate HST network, the network and handover procedures can be optimized for the high speed of the wireless devices.

However, the separation of HST networks and normal cellular networks does not work optimally as wireless devices which are not travelling on HSTs ends up using the HST network anyhow. The penetration loss of a HST is often high as the railroad cars have a wholly-enclosed structure. Therefore, the signal strength used in RBSs of the separate HST needs to be high in order to penetrate the railroad cars. This makes it hard to exclude non-HST devices from the HST network, as the devices want to access or camp on the cell with highest signal strength. Non-HST devices may thus steal capacity from devices travelling on HST trains. This results in insufficient capacity for devices travelling on HST trains. HST devices that could not be accommodated by the HST network may end up in the normal network with a high probability for dropped calls for a HST-device. Furthermore, the solution providing mobility between the networks is complex compared to mobility in an integrated network. Considering that the traffic load of a separate HST network in general is low, such a solution becomes costly.

Other existing solutions are based on normal cellular networks where the cell deployment is adapted to provide support for HST scenarios. FIG. 2b illustrates a normal cellular network where some cells 230 are defined as HST cells and configured to support the HST scenario, thus allowing for accurate handover procedures for high speed devices. One example may be to increase the cell overlapping areas between these cells 230. Such a solution is not flexible, as the cells are always adapted for HST scenarios, although HST only passes the cells occasionally. An alternative solution comprises performing speed estimations of wireless devices in order to adapt the mobility parameters for a wireless device that moves at high speed. However, such a solution is dependent on accurate positioning methods for the device, and speed estimations consume extra power and signaling resources.

SUMMARY

It is therefore an object to address some of the problems outlined above, and to provide an improved solution for providing accurate handovers for fast moving wireless devices on a HST or on other high speed vehicles. This object and others are achieved by the method and the radio network node according to the independent claims, and by the embodiments according to the dependent claims.

In accordance with a first aspect, a method for configuring neighboring cell relations of a cell is provided. The method is performed in a radio network node of a wireless communication system serving wireless devices in the cell. The method comprises monitoring a rate of wireless device accesses in the cell, and configuring neighboring cell relations of the cell based on the monitored rate of wireless device accesses in the cell.

In accordance with a second aspect, a radio network node of a wireless communication system for configuring neighboring cell relations of a cell is provided. The radio network node is adapted to serve wireless devices in the cell. The radio network node comprises a processing means adapted to monitor a rate of wireless device accesses in the cell, and configure neighboring cell relations of the cell based on the monitored rate of wireless device accesses in the cell.

An advantage of embodiments is that handovers for groups of rapidly moving wireless devices are improved based on a monitoring of wireless device accesses in a cell.

A further advantage of embodiments is that neighbor cell relations of a cell may be configured differently depending on the rate of wireless device accesses in the cell. When a HST enters a cell, this is indicated by an increased rate of wireless device accesses in the cell, and cell re-configurations may be performed to adapt neighbor cell relations to the situation. There is thus no need to estimate speed of individual wireless devices, or to use a cell configuration that is optimized for HST devices. A reduction of the number of neighbor cell relations, configured only when a HST is in the cell, will allow for more accurate handovers as each wireless device measures fewer neighbor cell frequencies when determining a target neighbor cell for handover.

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Figure 1A:
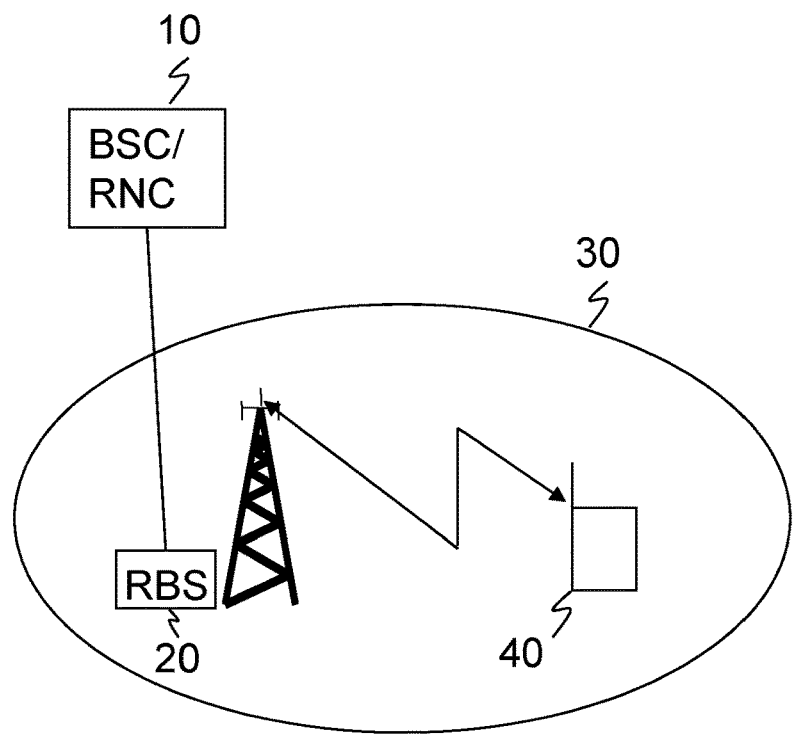
FIGS. 1a-b are schematic illustrations of radio access networks.
Figure 1B:
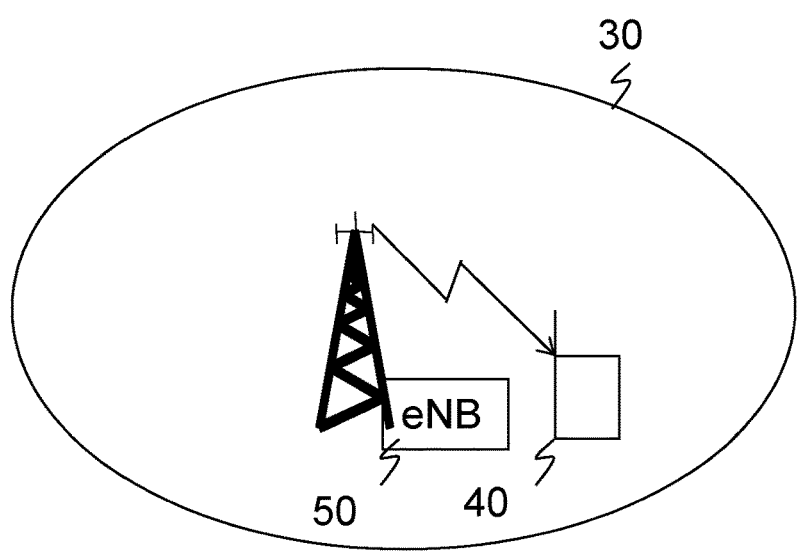
Figure 2A:
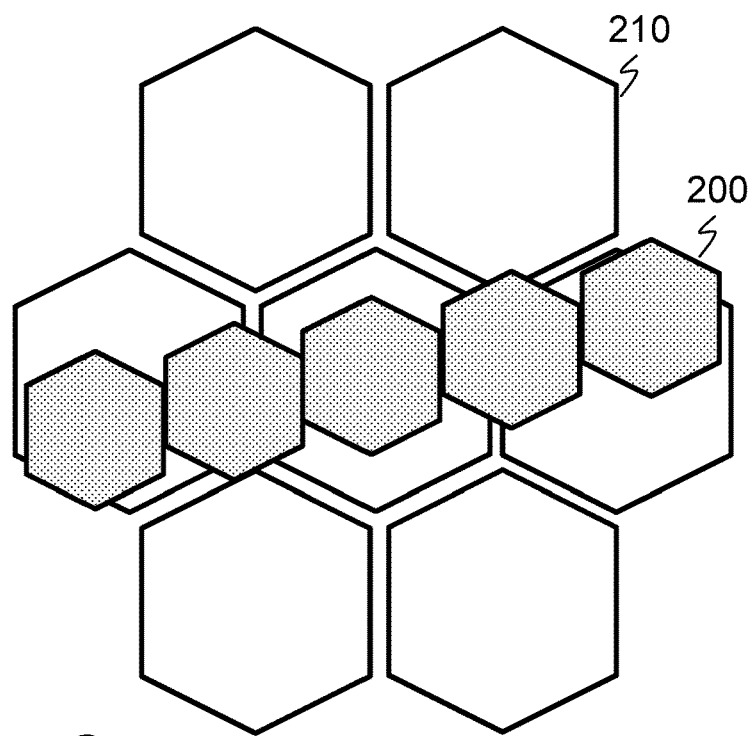
FIG. 2a is a schematic illustration of a separately deployed HST cellular network overlapping a normal cellular network.
Figure 2B:
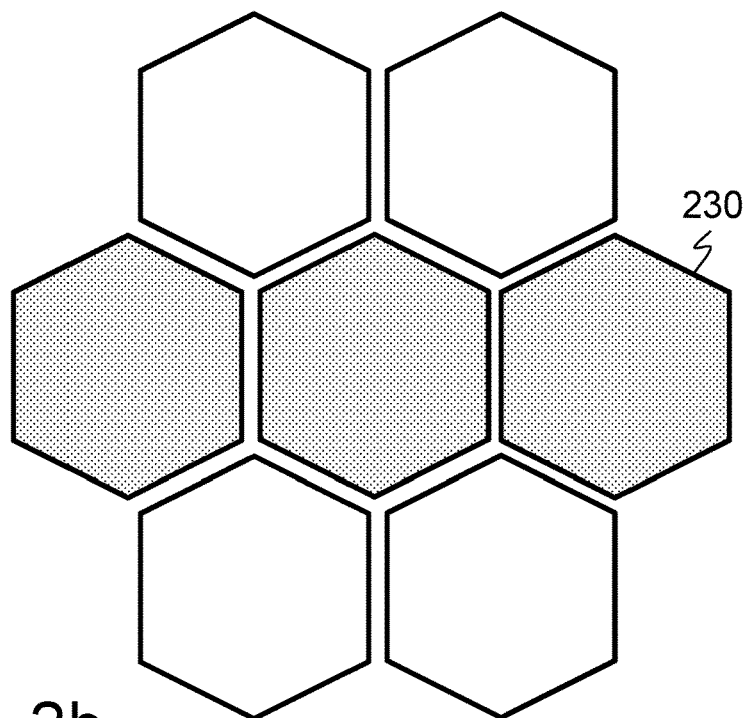
FIG. 2b is a schematic illustration of a cellular network with cells defined as HST cells integrated in a normal cellular network.

Embodiments are described in a non-limiting general context in relation to an example scenario in a GSM radio access network, where the radio network node serving the wireless devices in a cell and configuring the neighbor cell relations of the cell is a BSC communicating with the wireless devices through a BTS, as illustrated in FIG. 1a. However, it should be noted that the embodiments may be applied to any radio access network technology where a radio network node configures the neighbor cell relations of a cell and serves wireless devices in the cell, such as UMTS and LTE. Embodiments are also described in relation to a scenario with cells covering a HST railroad, although the embodiments may also be applied to other scenarios with rapidly moving devices in cells covering other transportation paths.

Figure 3A:
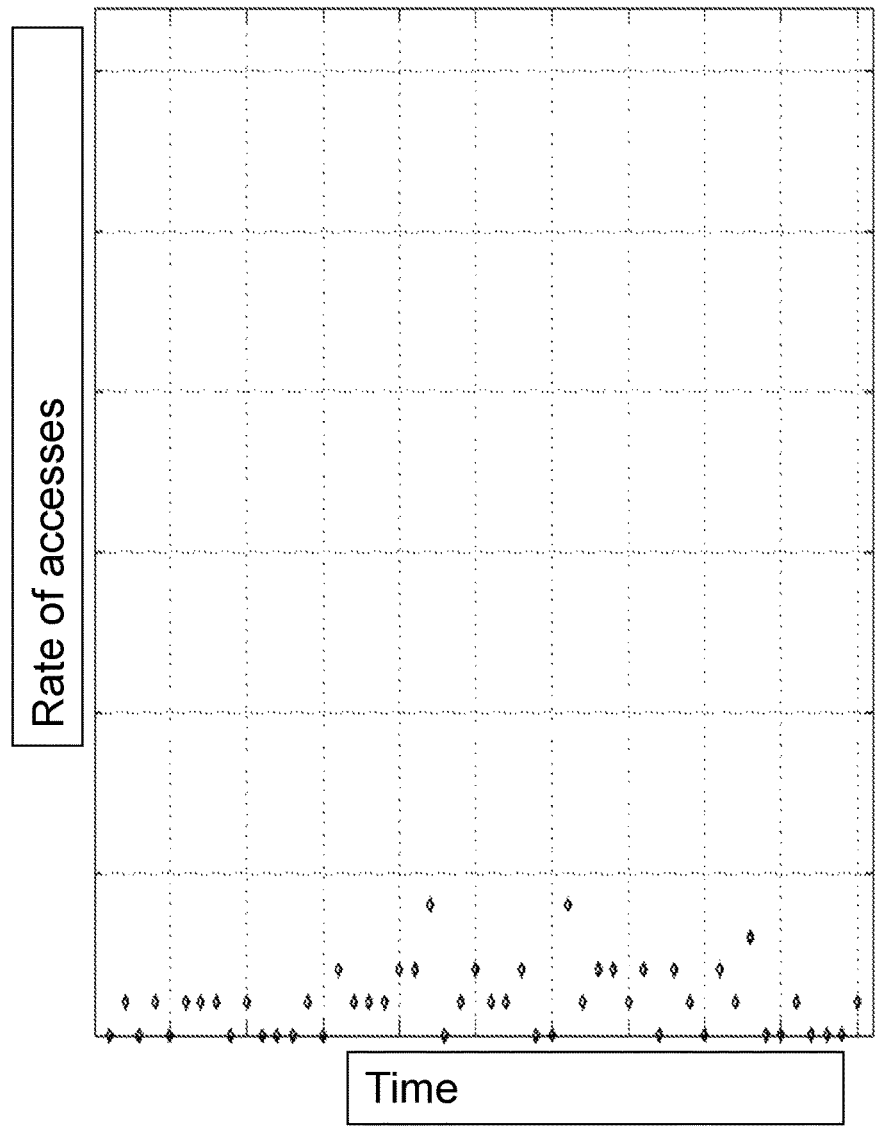
FIGS. 3a-b are diagrams illustrating a theoretical wireless device access rate over time.
Figure 3B:
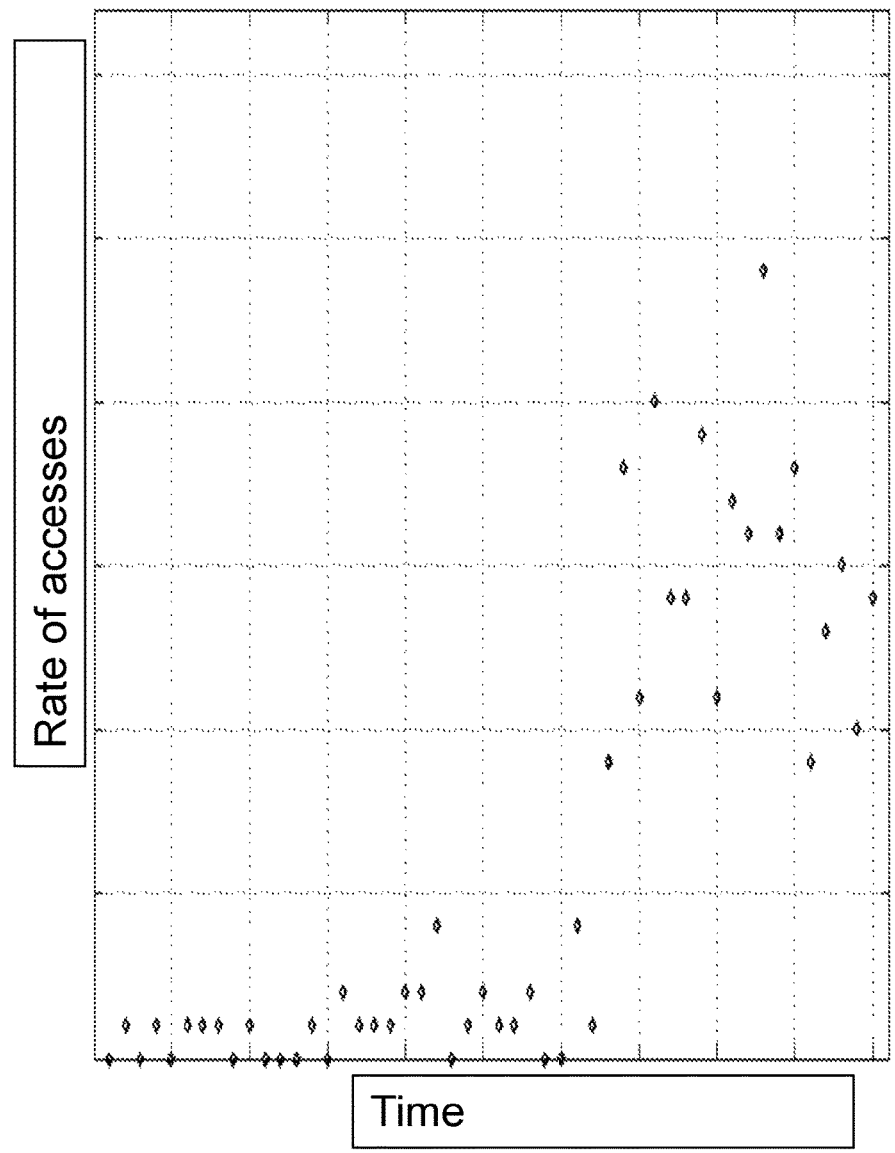

When a HST enters a cell of a GSM network covering the HST railroad, it is likely that many wireless devices will perform a wireless access in the cell within a short period of time. All wireless devices on the HST that are in connected mode will be doing a handover access to the cell, and some of the wireless devices on the HST that are in idle mode may be doing an initial access in the cell. A rate of wireless device accesses in a cell may thus be used to detect when a HST enters the cell. FIGS. 3a and 3b are diagrams where samples of the rate of wireless device accesses in a cell covering a HST railroad are plotted as a function of time. These diagrams are theoretically derived as there is no support for measuring the rate of accesses in current networks. In FIG. 3b a HST entering the cell may be detected as the rate of wireless device accesses suddenly increases dramatically when the HST enters the cell. When it is detected that a HST is entering the cell, the cell may be put in a HST mode. In the HST mode neighbor cell relations of the cell are configured such that the cell supports efficient and accurate handovers for all wireless devices in the cell. Most of the devices in the cell are wireless devices travelling on the HST. Therefore, the configuration of the neighbor cell relations may typically be to use a configuration with only a few neighbor cell relations which are relevant for a wireless device on a HST. The cells covering the HST railroad and defined as HST cells are examples of relevant neighbor cell relations. By making the list of neighbor cell relations shorter than normal, the measurements needed for the handover decisions will be more accurate, thus improving the handover quality. In GSM, the neighbor cell relations of a cell are given by a Broadcast Control Channel (BCCH) Allocation List (BA list). This is a list of frequencies supported in the neighboring cells. The BA list is broadcasted on the BCCH to provide the wireless devices in the cell with the frequencies of the BCCH carriers on neighboring cells. It is typically used by the wireless device when selecting target cell at handover.

Instead of estimating a speed of each individual wireless device in a cell to determine devices that need shorter neighbor cell relation lists in order to make accurate handovers, the whole cell is set to a HST mode when a HST is entering the cell. The HST mode implies that all devices in the cell are configured to use e.g. shorter neighbor cell relation lists for handover measurements. Less complexity and signaling resources are thus needed to obtain the same effect as in a solution using speed estimations of wireless devices. Furthermore, there is no need for a separate HST network or for a network where the cells covering the HST railroad are always configured to handle HST devices.

According to a general embodiment, a cell may thus be put in a different mode depending on a rate of wireless device accesses. The configuration of neighbor cell relations of the cell may be adapted to the different modes. Such a solution makes it possible to use different network configurations in a cell to accommodate to different traffic scenarios. Also network parameter configurations other than neighbor cell relation configurations may be adapted based on a monitored rate of wireless device accesses in a cell. This provides an even more flexible configuration. Some examples are:

1. Configuration of a HO hysteresis parameter. A decrease of the hysteresis corridor around the cell border would affect when a handover is performed and may e.g. be used to provide reliable handovers for wireless devices that are moving fast.
2. Configuration of how to use a subcell structure of the cell. A subcell structure may comprise overlaid and underlaid subcells. If a cell is configured with at least two frequencies, it can be split into two subcells—an overlaid subcell and an underlaid subcell. The underlaid subcell covers the area from the center (BTS) to the outer border of a cell coverage area. The coverage area of an overlaid subcell is typically significantly smaller and transmits at a lower power level than underlaid subcell. The overlaid subcell depends on the underlaid subcell, due to the fact that it cannot set up a call on its own. If allocation of traffic in an overlaid subcell is used for a cell in a normal traffic scenario, this may no longer be allowed in a scenario when a HST enters the cell.

3. Configuration of a size of the cell. Borders of a cell can be "moved" when the cell is put in HST mode, so that the cell's overlap with non-HST mode cells is narrowed and less non-HST devices enters the cell. This may e.g. be achieved by changing cell layer in a hierarchical cell structure.

The Detection Algorithm

The wireless device access rate for a cell can generally be modeled as a normal distribution. A wireless device makes an access in a cell either when it is handed over from another cell during an ongoing connection or when a new connection is set up enabling a call or a data transfer. These two cases are referred to as handover access and initial access respectively. The wireless device access rate of a cell, sometimes also referred to as an arrival rate, varies over the day but only with slow variations (see FIG. 3a). When a HST enters a cell with high speed and carrying many wireless devices with ongoing connections, this can be seen as a step in the wireless device access rate (see FIG. 3b), i.e. a quick variation. When the speed of the train and the number of devices are high enough the train may thus be detected by monitoring the wireless device access rate in a cell. If a combined cell is used, the detection of the train shall be done per radio head instead of per cell.

The train detection algorithm could be as simple as the use of a threshold for determining whether the monitored wireless device access rate indicates the arrival of a HST. However, more complicated algorithms finding peaks of the arrival rate may also be used. One example of a detection algorithm based on a binary hypothesis test is described hereinafter. The following two hypotheses are assumed:

$H_0$: No HST is in the cell.

$$H_0: y_t = A_t + w_t$$

$H_1$: A HST enters the cell.

$$H_1: y_y = \begin{cases} A_t + w_t & \text{if } t < T_0 \\ C + A_t + v_t & \text{if } t \geq T_0 \end{cases}$$

where $y_t$ is the wireless device access rate; $w_t$ is Gaussian white noise with $N(0, \sigma^2)$; $v_t$ is Gaussian white noise with $N(0, \rho^2)$; $A_t$ is an estimated deterministic function; $C$ is an estimated constant; $T_0$ is the time of the arrival of the train.

If $\bar{y}$ is the sampled function of $y_t$, $\bar{y} = \{y_t\}_{t=1}^N$, a probability density function can thus be calculated for $\bar{y}$ and $H_0$, $H_1$ respectively.

$$H_0: p(\bar{y}:H_0) = \prod_{t=1}^N p(y_t:H_0) = \prod_{t=1}^N \frac{1}{\sqrt{2\pi\sigma^2}} e^{-\frac{(y_t-A_t)^2}{2\sigma^2}}.$$

-continued $$H_1: p(\bar{y}:H_{10}) = \prod_{t=1}^N p(y_t:H_0) = \prod_{t=1}^{T_0-1} \frac{1}{\sqrt{2\pi\sigma^2}} e^{-\frac{(y_t-A_t)^2}{2\sigma^2}} * \prod_{t=T_0}^N \frac{1}{\sqrt{2\pi\rho^2}} e^{-\frac{(y_t-C-A_t)^2}{2\rho^2}}.$$

A likelihood ratio test $$L(\bar{y}) = \frac{p(\bar{y} \mid H_1)}{p(\bar{y} \mid H_o)} > \mu$$

may be used to determine when a HST is detected. The threshold $\mu$ should be set as to balance the importance of correct train detection compared to the risk of missing a train.

Method and Node

Figure 4A:
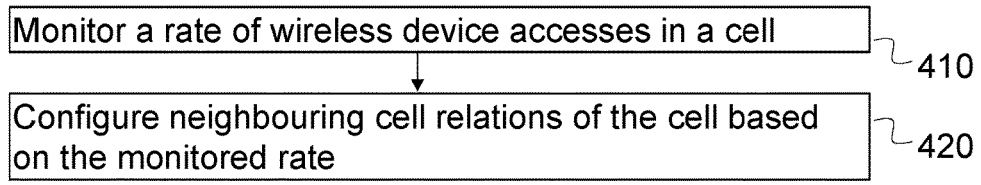
FIGS. 4a-b are flowcharts illustrating the method in the radio network node according to embodiments.

FIG. 4a is a flowchart illustrating a method for configuring neighboring cell relations of a cell 30 according to one embodiment. The method is performed in a radio network node of a wireless communication system serving wireless devices 40 in the cell. In embodiments of the invention the wireless communication system may be an LTE communication system and the radio network node may be an eNodeB 50, or the wireless communication system may be a GSM communication system and the radio network node may be a BSC 10. The method comprises:

410: Monitoring a rate of wireless device accesses in the cell. As already explained above, a wireless device performs access in the cell at handover from another cell—so called handover access—or at setup of a connection when in the cell—so called initial access. The monitored wireless device accesses in the cell may thus comprise at least one of initial accesses in the cell and handover accesses in the cell.

420: Configuring neighboring cell relations of the cell based on the monitored rate of wireless device accesses in the cell. If the radio network node is a BSC 10 in a GSM communication system, configuring the neighboring cell relations may comprise configuring the BA list for the cell.

Figure 4B:
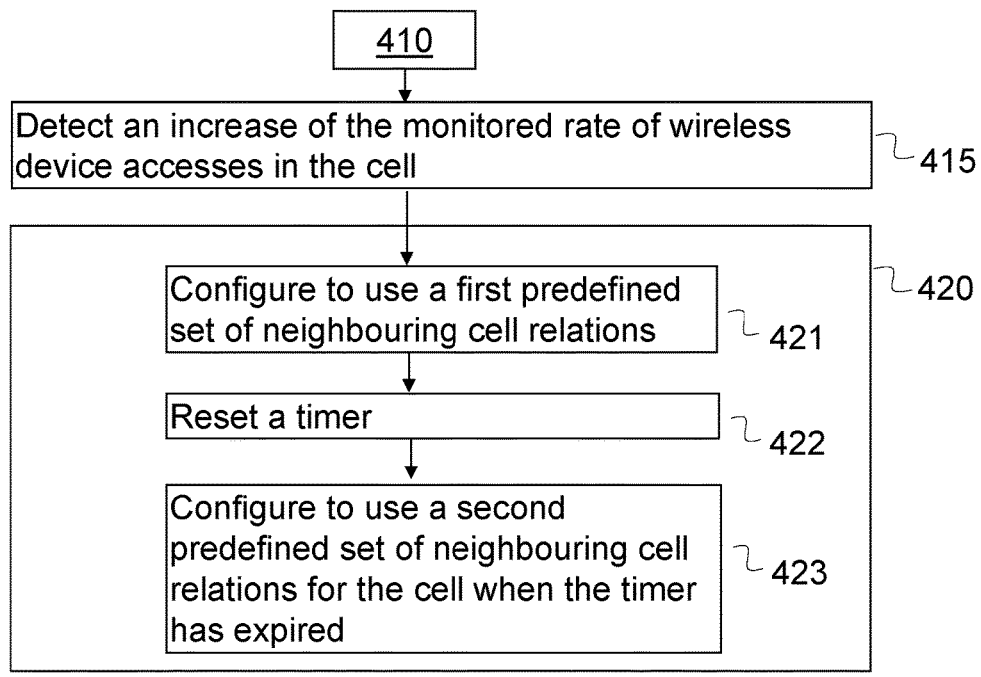

FIG. 4b is a flowchart illustrating another embodiment of the method in the radio network node. The method may comprise in addition to the monitoring in 410:

415: Detecting an increase of the monitored rate of wireless device accesses in the cell. An increase of the monitored rate of wireless device accesses may e.g. be detected using the binary hypothesis test described above. Such an increase is likely to happen e.g. when a HST enters the cell covering the HST railroad.

The configuring 420 of neighboring cell relations of the cell may in this embodiment further comprise:

421: Configuring to use a first predefined set of neighboring cell relations for the cell when the increase of the monitored rate is detected. The first predefined set of neighboring cell relations may comprise neighboring cells defined as covering a transportation path. The transportation path may e.g. be the HST railroad. In the GSM example, the BA list may be configured with a list of frequencies corresponding to the neighbor cells that are defined as covering the HST railroad only. The BA list is thus reduced and the wireless devices will have time to do more accurate handover measurements even though they are travelling fast.

422: Resetting a timer when configuring to use the first predefined set of neighboring cell relations for the cell.

423: Configuring to use a second predefined set of neighboring cell relations for the cell when the timer has expired.

By setting the timer in 422 when an increase of the monitored rate of wireless device accesses is detected, e.g. when a HST train is entering the cell, it is possible to return back to normal mode when the train has left the cell coverage. The time of the timer should thus be the time it typically takes for a HST to pass the cell with some margin. When the timer has expired, the wireless devices in the cell are non-HST devices and the cell configuration may be adapted for wireless devices moving at normal speed again. The second predefined set of neighboring cell relations may correspond to a normal mode configuration, and the first predefined set of neighboring cell relations may correspond to a HST mode configuration with fewer neighbor cell relations comprising e.g. only the neighbor cells defined as cells covering the HST railroad.

In embodiments of the invention, the method may further comprise performing at least one of the following actions based on the monitored rate of wireless device accesses in the cell:

Configuring of a handover hysteresis parameter;
Configuring of how to use a subcell structure of the cell; and
Configuring of a size of the cell.

Figure 5A:
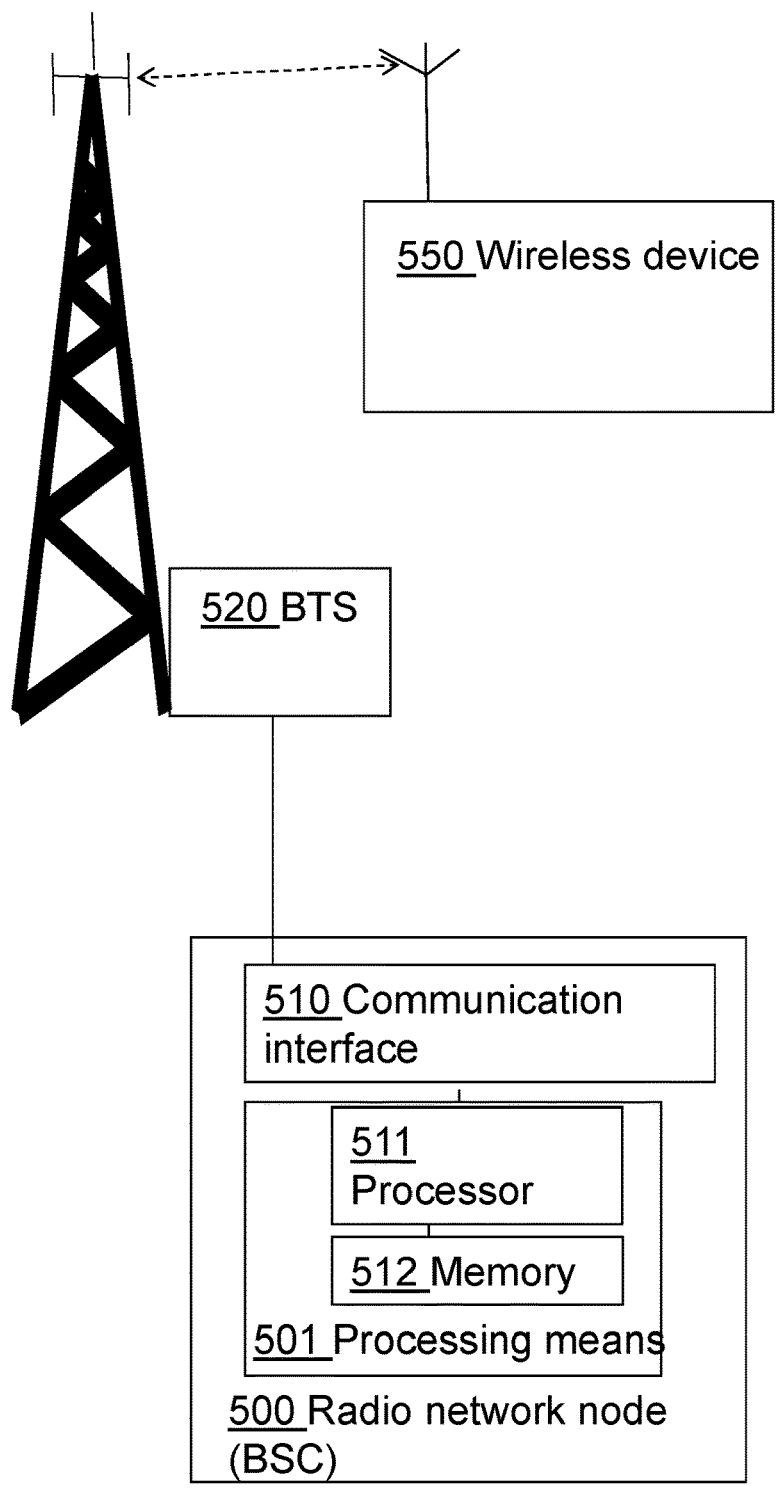
FIGS. 5a-b are block diagram schematically illustrating the radio network node according to embodiments.
Figure 5B:
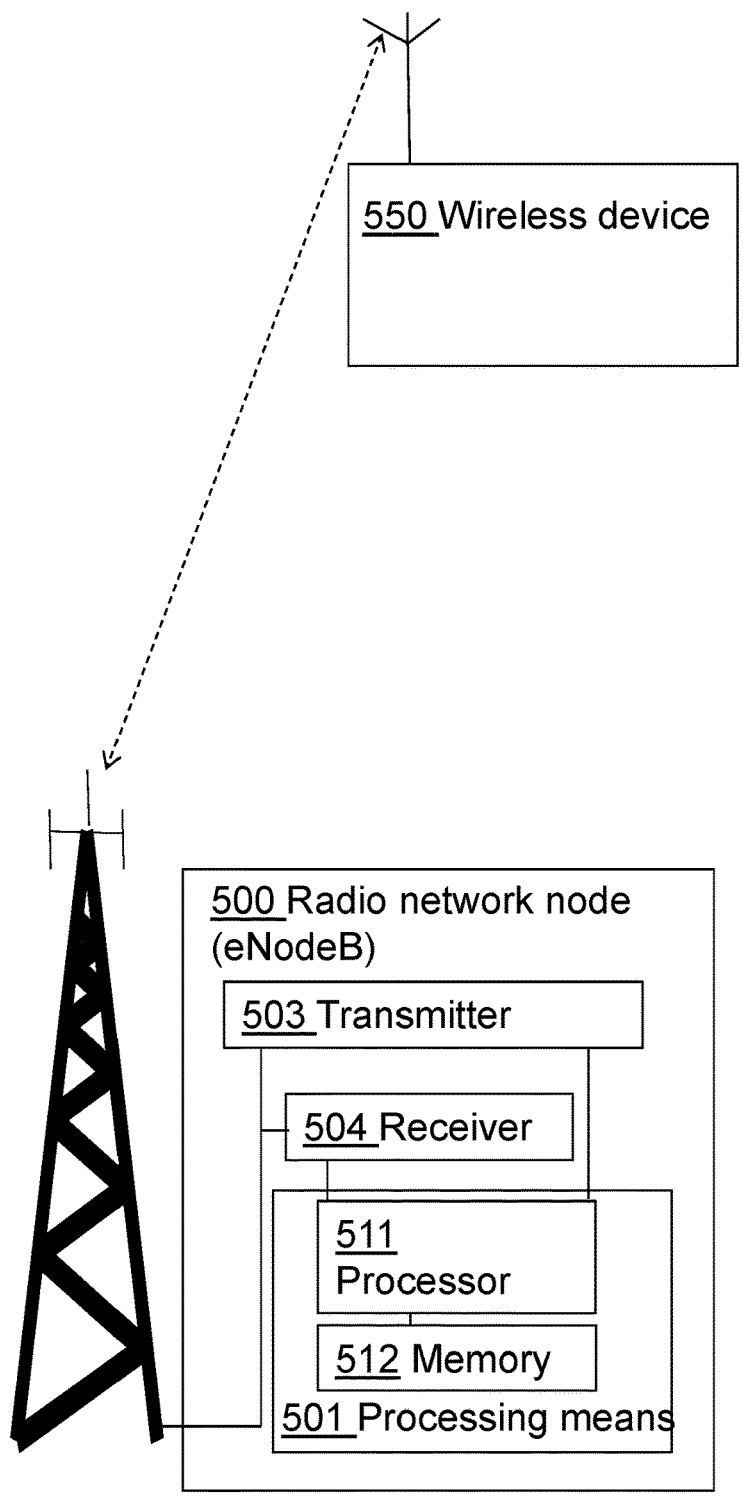

Embodiments of a radio network node 500 of a wireless communication system for configuring neighboring cell relations of a cell is schematically illustrated in the block diagram in FIGS. 5a and 5b. The radio network node 500 is adapted to serve wireless devices 550 in the cell. The radio network node 500 comprises a processing means 501 adapted to monitor a rate of wireless device accesses in the cell, and to configure neighboring cell relations of the cell based on the monitored rate of wireless device accesses in the cell. The wireless device accesses in the cell may comprise at least one of: initial accesses in the cell; and handover accesses in the cell.

In FIG. 5a, the radio network node 500 is a BSC in a GSM communication system. The BSC may also comprise a communication interface 510 for communicating with the wireless devices 550 via the BTS 520. The processing means 501 of the BSC may be adapted to configure the neighboring cell relations by configuring a BA list for the cell. In FIG. 5b, the radio network node 500 is an eNodeB in an LTE communication system. The eNodeB may also comprise a transmitter 503 and receiver 504 for communicating with the wireless devices 550 of the cell.

In embodiments, the processing means 501 may be further adapted to detect an increase of the monitored rate of wireless device accesses in the cell, e.g. based on the binary hypothesis test described above, and to configure the neighboring cell relations of the cell by using a first predefined set of neighboring cell relations for the cell when the increase of the monitored rate is detected. The first predefined set of neighboring cell relations may comprise neighboring cells defined as covering a transportation path, such as a HST railroad. The processing means 501 may be further adapted to reset a timer when configuring to use the first predefined set of neighboring cell relations for the cell. The processing means 501 may also be adapted to configure the neighboring cell relations of the cell by using a second predefined set of neighboring cell relations for the cell when the timer has expired.

In another embodiment, the processing means 501 may be further adapted to perform at least one of the following actions based on the monitored rate of wireless device accesses in the cell: configuring a handover hysteresis parameter; configuring how to use a subcell structure of the cell; and configuring a size of the cell.

As illustrated in FIGS. 5a and 5b, the processing means 501 may comprise a processor 511 and a memory 512. The memory 512 may contain instructions executable by said processor 511, whereby said radio network node 500 is operative to monitor a rate of wireless device accesses in the cell, and configure neighboring cell relations of the cell based on the monitored rate of wireless device accesses in the cell. In embodiments, the memory 512 may contain further instructions executable by said processor 511 whereby said radio network node is operative to detect an increase of the monitored rate of wireless device accesses in the cell, e.g. based on the binary hypothesis test described above, and to configure the neighboring cell relations of the cell by using a first predefined set of neighboring cell relations for the cell when the increase of the monitored rate is detected. The first predefined set of neighboring cell relations may comprise neighboring cells defined as covering a transportation path, such as a HST railroad. The memory 512 may contain further instructions executable by said processor 511, whereby said radio network node is operative to reset a timer when configuring to use the first predefined set of neighboring cell relations for the cell, and to configure the neighboring cell relations of the cell by using a second predefined set of neighboring cell relations for the cell when the timer has expired. In another embodiment, the memory 512 may contain further instructions executable by said processor 511, whereby said radio network node is operative to perform at least one of the following actions based on the monitored rate of wireless device accesses in the cell: configuring a handover hysteresis parameter; configuring how to use a subcell structure of the cell; and configuring a size of the cell.

It is to be noted that the term processor used herein includes any hardware capable of executing instructions and/or program codes, e.g., a microprocessor such as a Central Processing Unit (CPU), a digital signal processor (DSP), or any other general-purpose or application specific processors. Furthermore, the term memory used herein includes any storage medium capable of storing instructions and/or program codes, e.g., a magnetic storage medium, an optical storage medium, a semiconductor storage medium and any other volatile or non-volatile storage mediums.

In an alternative way to describe the embodiments in FIGS. 5a-b, the radio network node 500 comprises means adapted to monitor a rate of wireless device accesses in the cell, and means adapted to configure neighboring cell relations of the cell based on the monitored rate of wireless device accesses in the cell. The means described above are functional units which may be implemented in hardware, software, firmware or any combination thereof. In one embodiment, the means are implemented as a computer program running on a processor.

The above mentioned and described embodiments are only given as examples and should not be limiting. Other solutions, uses, objectives, and functions within the scope of the accompanying patent claims may be possible.

The invention claimed is:

1. A method for configuring neighboring cell relations of a cell, the method being performed in a radio network node of a wireless communication system serving wireless devices in the cell, the method comprising:

monitoring a rate of wireless device accesses in the cell; and configuring neighboring cell relations of the cell based on the monitored rate of wireless device accesses in the cell, wherein configuring neighboring cell relations of the cell comprises:
  resetting a timer when configuring to use a first predefined set of neighboring cell relations for the cell; and
  configuring to use a second predefined set of neighboring cell relations for the cell when the timer has expired.

2. The method of claim 1, further comprising:
  detecting an increase of the monitored rate of wireless device accesses in the cell, and wherein configuring neighboring cell relations of the cell comprises configuring to use the first predefined set of neighboring cell relations for the cell when the increase of the monitored rate is detected.

3. The method of claim 2, wherein the first predefined set of neighboring cell relations comprises neighboring cells defined as covering a transportation path.

4. The method of claim 1, further comprising performing at least one of the following actions based on the monitored rate of wireless device accesses in the cell:
  configuring of a handover hysteresis parameter;
  configuring of how to use a subcell structure of the cell; and
  configuring of a size of the cell.

5. The method of claim 1, wherein the radio network node is a base station controller (BSC) in a GSM communication system, wherein configuring the neighboring cell relations comprises configuring a broadcast control channel allocation list for the cell.

6. The method of claim 1, wherein the wireless device accesses in the cell comprise at least one of:
  initial accesses in the cell; and
  handover accesses in the cell.

7. A radio network node of a wireless communication system for configuring neighboring cell relations of a cell, the radio network node being adapted to serve wireless devices in the cell, the radio network node comprising a processor adapted to:
  monitor a rate of wireless device accesses in the cell;
  configure neighboring cell relations of the cell based on the monitored rate of wireless device accesses in the cell;
  reset a timer when configuring to use a first predefined set of neighboring cell relations for the cell; and
  configure the neighboring cell relations of the cell by using a second predefined set of neighboring cell relations for the cell when the timer has expired.

8. The radio network node of claim 7, wherein the processor is further adapted to:
  detect an increase of the monitored rate of wireless device accesses in the cell, and configure the neighboring cell relations of the cell by using the first predefined set of neighboring cell relations for the cell when the increase of the monitored rate is detected.

9. The radio network node of claim 7, wherein the first predefined set of neighboring cell relations comprises neighboring cells defined as covering a transportation path.

10. The radio network node of claim 7, wherein the processor is further adapted to perform at least one of the following actions based on the monitored rate of wireless device accesses in the cell:
  configuring of a handover hysteresis parameter;
  configuring of how to use a subcell structure of the cell; and
  configuring of a size of the cell.

11. The radio network node of claim 7, wherein the radio network node is a base station controller (BSC) in a GSM communication system, wherein the processor is further adapted to configure the neighboring cell relations by configuring a broadcast control channel allocation list for the cell.

12. The radio network node of claim 7, wherein the wireless device accesses in the cell comprise at least one of:
  initial accesses in the cell; and
  handover accesses in the cell.

* * * * *